United States Patent [11] 3,612,890

| [72] | Inventors | William S. Cornyn, Jr.<br>Palo Verdes Peninsula;<br>William Pennington, Jr., Los Angeles;<br>Antone Potocnik, Palos Verdes Peninsula;<br>Wallace M. Porter, Redondo Beach, all of<br>Calif. |
|---|---|---|
| [21] | Appl. No. | 865,668 |
| [22] | Filed | Oct. 13, 1969 |
| [45] | Patented | Oct. 12, 1971 |
| [73] | Assignee | TRW Inc.<br>Redondo Beach, Calif. |

[54] RADIATION SENSITIVE OPTICAL GAGING SYSTEM
17 Claims, 9 Drawing Figs.

[52] U.S. Cl. .................................................. 250/222,
356/167, 250/219
[51] Int. Cl. ...................................................... G01b 7/04
[50] Field of Search......................................356/156–158,
167, 170, 241, 4, 3; 250/219 WD,
219 LG, 219 TH, 219 DF, 222, 202

[56] References Cited
UNITED STATES PATENTS

| 2,213,024 | 8/1940 | Cole ........................... | 250/222 |
| 3,016,464 | 1/1962 | Bailey.......................... | 250/219 |
| 3,187,185 | 6/1965 | Milnes.......................... | 250/222 |
| 3,267,287 | 8/1966 | Berthelsen.................... | 250/222 |
| 3,325,649 | 6/1967 | Bird.............................. | 250/219 |
| 3,362,284 | 1/1968 | Patrignani .................... | 250/219 X |
| 3,428,815 | 2/1969 | Thompson.................... | 250/222 X |
| 3,523,736 | 8/1970 | Bottomley.................... | 356/170 X |

*Primary Examiner*—Walter Stolwein
*Attorneys*—Daniel T. Anderson, Donald R. Nyhagen and Jerry A. Dinardo ABSTRACT: An optical gaging system wherein a light beam is projected onto the surface of an object to illuminate the surface with a small light spot, and light rays emanating from the illuminated surface area by diffuse reflection are collected and focused at an observation station to produce at the station a light-spot image whose position is related to the position of the illuminated surface area along the beam axis. the image position is sensed electrically and converted to a corresponding electrical position signal. The gaging system is capable of a variety of useful applications including automatic control of machining operations, dimensional measurement, and surface contour or profile gaging.

3,612,890
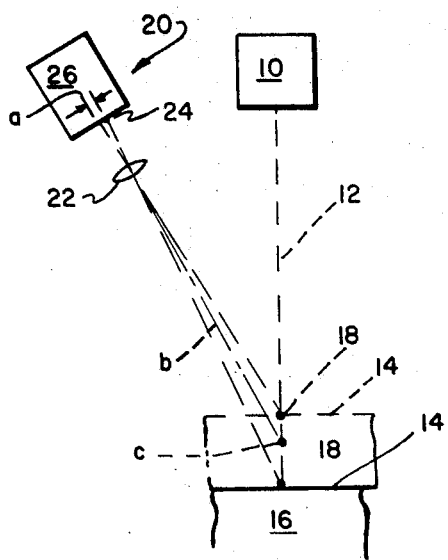
Fig. 1
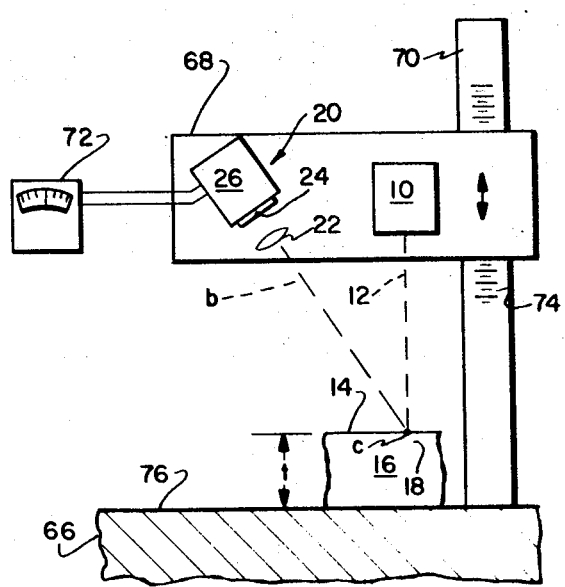
Fig. 4
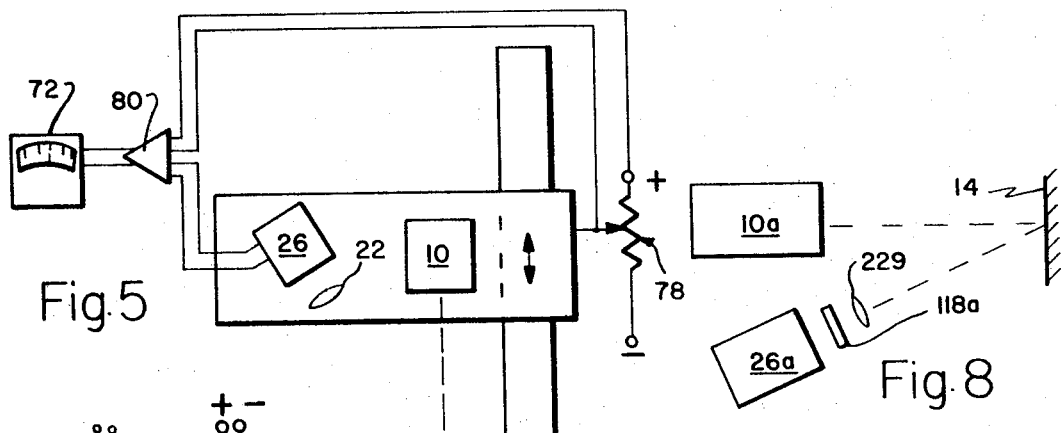
Fig. 5
Fig. 8
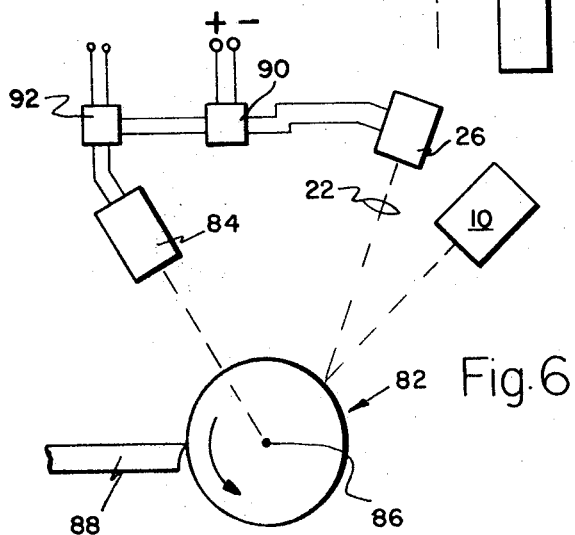
Fig. 6
William S. Cornyn Jr.
William Pennington
Antone Potocnik
Wallace M. Porter
INVENTOR.

RADIATION SENSITIVE OPTICAL GAGING SYSTEM

BACKGROUND OF THE INVENTION

1. Field of the Invention

This invention relates generally to the gaging art and more particularly to a novel optical gaging system.

The present invention is concerned generally with an optical gaging system wherein a narrow light beam is projected onto the surface of an object and light rays reflected from the surface are collected and focused on a photosensitive image receiver located at an observation station to produce on the receiver a light image whose position varies with the position of the surface. The image receiver senses the image position and converts the same to a corresponding electrical position signal related to the image position and hence to the position of the surface.

Optical gaging systems of the general class described have certain inherent deficiencies which the present invention avoids. Foremost among these are inability to discriminate between light reflected from the beam and ambient light, responsiveness to changes in total beam intensity and surface reflectivity, and use of specular reflection to produce the light image at the observation station. The disadvantages of an optical gaging system which is incapable of discriminating between reflected light and ambient light or which is responsive to total beam intensity or surface reflectivity will be obvious to those versed in the art and need not be discussed in detail. The major disadvantage, of course, resides in the fact that such gaging systems are subject to substantial gaging error as a consequence of changes in ambient light intensity, total beam intensity, and/or surface reflectivity. The use of specular reflection for optical gaging also presents several disadvantages. For example, the illuminated surface must be highly reflective. Further, a change in the angle of the surface relative to the axis of the incident beam causes image displacement at the observation station which introduces gaging error. Another disadvantage of specular reflection is that the incident light beam must impinge the object surface at an oblique angle, and the observation station must be accurately located on the axis of the reflected beam. These latter factors severely limit both the effective gaging system range and occurrence of The specular gaging system. In this regard, it will be evident that with a specular reflection system, relative displacement of the illuminated surface along the axis of the incident beam causes parallel lateral translation of the image beam reflected to the observation station. Such parallel translation of the reflected beam precludes the use of a lens to focus the beam at the observation station, since the light image at the station will then remain stationary at the focal point of a lens to focus the beam at the observation station, since the light image at the station will then remain stationary at the focal point of the lens throughout the range of beam displacement from one side of the lens to the other. A small image area as required for high-gaging accuracy, therefore, necessitates the use of an equally narrow light beam and hence a beam source of relatively high intensity to attain the required image intensity. A one-to-one correspondence will also exist between surface displacement and image displacement with the result that the gaging range is severely restricted.

SUMMARY OF THE INVENTION

The present inventioN provides an improved optical gaging system which is free of the above defects. One important feature of the invention, for example, resides in the use of diffuse reflection from the illuminated surface being gaged, rather than specular reflection, to produce the image at the observation station. According to this Feature, a light beam is projected onto the surface to illuminate the surface with a small light spot, and light rays emanating by diffuse reflection from the illuminated surface area are collected and focused at the observation station to produce an optical image of the light spot at the station. This diffuse reflection method of image formation presents several advantages. It renders the gaging system relatively immune to gaging error resulting from a change in the angle of incidence of the beam on the surface being gaged, thereby permitting contour or profile gaging of nonplanar surfaces, for example; it permits optical reduction of image area and displacement relative to incident beam area and surface displacement with resultant increased gaging accuracy and range; and it provides increased latitude in the relative positioning of the beam source, surface, and observation station.

According to another important feature of the invention, the optical gaging system is rendered capable of discriminating between ambient light and reflected light from the surface being gaged. In those situations wherein the ambient light has a relatively low and constant intensity level compared to the intensity level of the light spot projected onto the surface being gaged, such discrimination may be accomplished without the aid of additional light discrimination means other than the relatively high intensity level of the light spot. In other situations, where the ambient light conditions are such as to preclude light discrimination by light spot intensity alone, such discrimination is accomplished by utilizing a light beam composed of light having a unique characteristic which is detected to discriminate the reflected light rays arriving at the observation station from ambient light. This unique characteristic may be the wavelength of the beam light, in which case light discrimination may be accomplished by passing the reflected light through an appropriate light filter to the image receiver. Alternatively, the unique beam light characteristic may be an intensity modulation frequency produced by pulsing the light beam or beam source. In this case, discrimination may be accomplished by filtering the electrical output from the photosensor of the image receiver.

Another feature of the invention is concerned with eliminating response of the optical gaging system to changes in total beam intensity and surface reflectivity. One disclosed method of accomplishing this involves feedback control of the light-beam intensity level response to the image intensity level at the image receiver in such a way as to maintain the image intensity level constant. Another technique permits the beam intensity level to fluctuate and processes the electrical output of the receiver photosensor in such a way as to effectively cancel out gaging error resulting from such fluctuation.

In most optical gaging application, it is desirable to have a linear response; that is it is desirable to have the position output signal from the image receiver vary linearly with the position along the incident beam axis of the object surface being gaged. According to another feature of the invention, such linear response is accomplished by masking techniques and/or by electrical linearizing techniques.

The present optical gaging system is capable of a great variety of useful applications. The disclosed applications of the gaging system involve automatic control of machining operation, dimensional measurement, and surface contour or profile gaging.

BRIEF DESCRIPTION OF THE DRAWINGS

In the drawings:

FIG. 1 illustrates a gaging system according to the invention;

FIG. 4 illustrates an optical micrometer according to the invention;

FIG. 5 illustrates a modified optical micrometer;

FIG. 6 illustrates the present gaging system used for controlling a machining operation;

FIG. 8 illustrates a modified gaging system; and

DESCRIPTION OF THE PREFERRED EMBODIMENTS

Figure 2:
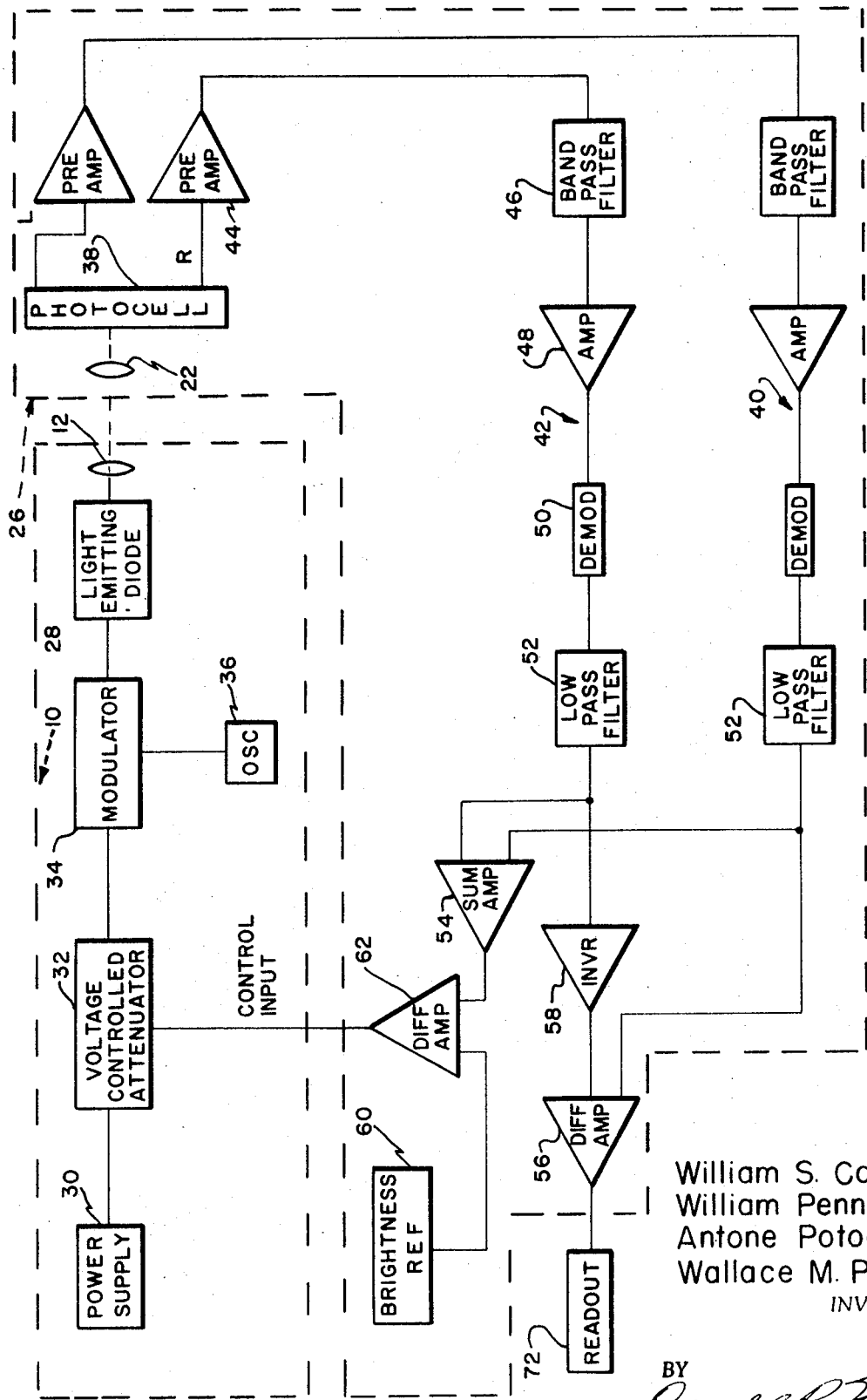
FIG. 2 is an electrical circuit diagram of the gaging system.

Turning first to FIG. 1, there is illustrated an optical gaging system according to the invention having a beam source 10 for projecting a narrow light beam 12 onto the surface 14 of an object 16 to produce on the surface a small light spot 18. Located at an observation station 20 within the field of view of the light spot is a lens 22 which receives light rays of the beam 12 by diffuse reflection from the illuminated area of the surface 14. The lens collects and focuses these reflected rays to produce at the observation station an image 24 of the light spot. Assume now that the object surface 14 is moved back and forth along the axis of the incident light beam 12 so as to vary the spacing between the surface and the observation station. This surface movement causes proportional angular displacement of the line of sight from the observation station to the light spot 18 and proportional lateral displacement $a$ of the light spot image at the statiOn along an image displacement axis transverse to the optic axis $b$ of the lens 22.

Located at the observation station 20 is a photosensitive image receiver 26 which receives the light spot image 24. This receiver generates an output signal related to the position of the image along the image displacement axis. In the particular inventive embodiment shown, the beam source 10 and image receiver 26 have a fixed positional relationship wherein the receiver lens axis $b$ intersects the beam axis at an acute angle. When the object surface 14 is located at the axis intersection point, the light spot image 24 falls on the lens axis. Displacement of the surface in either direction from the axis intersection point results in proportional lateral displacement of the light spot image from the lens axis. It will now be understood, therefore, that the image receiver 26 produces an output signal related to the position of the object surface 14 along the axis of Beam 12.

It is significant to note here that the term "light" in the context of the present disclosure encompasses electromagnetic radiation throughout the wavelength range which is broadly defined as "light," i.e. electromagnetic radiation in the wavelength range including the infrared, visible, and ultraviolet regions of the electromagnetic radiation spectrum.

A variety of photosensitive receivers 26 may be employed to receive the light-spot image 24 at the observation station 20 and to generate an output signal related to the position, or displacement from the reference position $c$, of the object surface 14. Generally speaking, however, the receiver will comprise photosensitive means on which the light-spot image falls and an electrical circuit for converting the output of the photosensitive means to an electrical position signal related to the position of the object surface 14 along the beam axis. In one later described embodiment of the invention, for example, the photosensitive means comprises a linear photocell which extends along the image displacement axis so that movement of the object surface 14 along the axis of the incident light beam 12 causes movement of the light-spot image 24 along the photocell. The photocell generates two output voltages related to the position of the image along the photocell. These voltages are combined to produce a final position signal representing the magnitude and direction of the displacement of the image from a reference null position midway between the ends of the photocell and hence also the magnitude and direction of the displacement of the object surface from a reference position $c$ along the beam axis wherein the image occupies its null position. In another described embodiment, the image reflected to the observation station 20 falls on a beam splitter which reflects the two portions of the image onto two separate photocells. The output voltages of these photocells are combined to produce a position signal related to the displacement of the image and object surface from their respective reference positions.

As noted earlier, utilization of diffuse reflection rather than spectral reflection from the object surface 14 to form the light spot image 24 at the observation station 20 constitutes an important feature of the invention. The advantages which result from such image formation by diffuse reflection have already been discussed and hence need not be repeated. It is significant to note at this point, however, that in the illustrated embodiment under consideration, the incident light beam 12 impinges the object surface 14 at right angles. Accordingly, the observation station 20 may be located at any position within the field of view of the light spot 18 on the object surface without receiving any spectral reflection from the surface. In the event that the light beam impinges the surface at an oblique angle of incidence, it may be necessary to displace the observation station from the spectral reflection axis of the beam in order to prevent spectral reflection from introducing gaging error into the output of the gaging system.

It will be recalled from the earlier discussion that another important feature of the invention is concerned with eliminating response of the optical gaging system to total light beam intensity, surface reflectivity, and ambient light. One disclosed technique of eliminating gaging system response to total beam intensity and surface reflectivity involves regulation of the intensity level of the incident light beam 12 in response to the intensity level of the light spot image 24 in such a way as to maintain the image intensity level constant.

Another disclosed technique eliminating gaging system response to total beam intensity and surface reflectivity involves an electrical rotating technique which effectively cancels out gaging error resulting from image intensity changes occasioned by changes in beam intensity or surface reflectivity.

Elimination of gaging system response to ambient light involves rendering the gaging system capable of discriminating between reflected light from the object surface 14 and ambient light. As noted earlier, such light discrimination may be accomplished in various ways. For example, in situations where the ambient light has a relatively constant and low level of intensity, the relatively high intensity level of the light spot image 24 may be sufficient to discriminate the reflected light from the ambient light without the aid of additional light discrimination means. In other cases, the use of light discrimination means may be necessary to discriminate between the reflected light and the ambient light. Two methods of accomplishing this light discrimination are disclosed. In each case, discrimination involves utilization of an incident light beam composed of light having a unique characteristic which is detected to distinguish the reflected light from the ambient light. In one disclosed technique, for example, the light beam is composed of light of a selected wavelength range which differs substantially from the wavelength range of the ambient light. In this case, there is placed in front of the image receiver 26 at the observation station 20 a light filter which passes only light of the selected wavelength range, such that only beam light reflected from the object surface 14 is transmitted to the receiver. According to another disclosed light discrimination technique, the intensity of the incident light beam 12 is modulated at a selected frequency, and the image receiver 26 is designed to respond only to incident light characterized by intensity modulation at the selected frequency.

Attention is now directed to FIG. 2 which schematically illustrates one electrical circuit configuration which may be employed in the present gaging system to accomplish the above discussed features of the invention In this particular circuit configuration, the light beam source 10 comprises a light emitter 28, such as a light emitting diode, whose emission intensity level may be modulated at a selected fixed frequency. The light emitter is energized from a power supply 30 through a voltage controlled attenuator 32 and a light intensity modulator 44. As will be explained presently, the attenuator 32 is controlled by a feedback signal proportional to the intensity level of the light spot image 24 at the image receiver 26 to maintain a constant image intensity level. The light intensity modulator 34 is driven by an oscillator 36 to modulate the intensity level of the emitter 28 at a selected frequency.

The image receiver 26 comprises photosensitive means 38 situated on the optic axis and in the focal plane of the receiver lens 22. Lens 22 collects and focuses reflected light from the surface 14 to produce the light spot image 24 on the photosensitive means. In the particular inventive embodiment illustrated, the photosensitive means 38 is a linear photocell whose longitudinal axis coincides with the image displacement axis of the image receiver and whose center or null point is located approximately on the lens axis. The two ends of this photocell are connected to two separate circuit channels 40 and 42. Each circuit channel includes, in series, a preamplifier 44, a band-pass filter 46, an amplifier 48, a demodulator 50, and a low-pass filter 52. Connected in parallel to the outputs of the low-pass filter 52. Connected in parallel to the outputs of the low-pass filters 52 are a summing amplifier 54 and a differencing amplifier 56. An inverter 58 is connected in series between one low-pass filter 52 and the differencing amplifier 56. The outputs of the summing amplifier 54 and an intensity reference signal generator 60 are connected to a differencing amplifier 62. The output of this differencing amplifier is connected to the light beam attenuator 32.

Assuming that the optical gaging system is operated in the presence of ambient light, the photosensor 38 receives both ambient light and rays of the beam 12 which are transmitted to the image receiver 26 by diffuse reflection from the object surface 16 to form the light spot image 24 on the photosensor. The photosensor converts the energy of the incident light spot image into two voltage signals which are fed to the circuit channels 40, 42, respectively. These voltage signals fluctuate at the modulation frequency of the modulator 34 and between voltage levels which differ by an amount substantially proportional to the displacement of the light spot image 24 from the central reference or null position of the photosensor and hence proportional to the displacement of the object surface 14 from its reference position $c$ along the beam axis. Thus, if the surface is located at its reference position $c$, the light spot image falls squarely on its null position and the output voltage signals from the two ends of the photosensor fluctuate between approximately equal voltage levels and have substantially equal means or average values. Displacement of the image from the null positiOn toward either end of the photosensor occasioned by corresponding displacement of the surface 14 from its reference position $c$ produces a proportional increase in the means or average value of the voltage signal from that end and an equivalent decrease in the mean or average value of the voltage signal from the opposite end of the photosensor. Each circuit channel 40, 42 filters and demodulates its respective input voltage signal from the photosensor to produce at the output of its final low-pass filter 52 a varying DC signal whose amplitude is substantially proportional to the mean or average value of the respective input voltage signal. In this regard, it will be understood that the filters 46, 52 in the circuit channels are designed to pass only the modulation frequency introduced by the light-beam modulator 34 so as to filter out components of the photosensor output voltages produced by the ambient light.

The output voltage from the circuit channel 40 is fed directly to the summing amplifier 54 and the differencing amplifier 56. The output voltage from the circuit channel 42 is fed directly to the summing amplifier 54 and is fed to the differencing amplifier 56 through the inverter 58. The summing amplifier 54 adds the two circuit channel voltages to produce a DC signal whose magnitude is proportional to the total intensity of the light spot image 24 incident on the photosensor 38. The differencing amplifier 56 subtracts the two circuit channel voltages to produce a DC signal whose amplitude is proportional to the displacement of the light spot image from its reference or null position along the photosensor 38 and whose polarity represents the direction of the displacement. Thus, if the image falls squarely on the null position, the circuit channel voltages fed to the differencing amplifier 56 will be equal in magnitude and opposite in sign so that the amplifier produces a null output. If the image is displaced in either direction from the null position, the differencing amplifier produces a positive or negative DC output signal, depending upon the direction of the displacement, whose amplitude is proportional to the image displacement. It will now be understood, therefore, that the image receiver 26 produces a DC voltage signal whose amplitude is proportional to the magnitude and whose sign represents the direction of the displacement of the object surface 14 and its reference position $c$ along the axis of the incident beam 12.

The outputs of the summing amplifier 54 and the brightness reference signal generator 60 are fed to the differencing amplifier 62. The reference signal generator 60 generates a constant DC voltage output representing a selected total intensity of the light spot image 24. The generator is adjustable to any selected image intensity level over a given range. It will now be understood, therefore, that the output of the differencing amplifier 62 is a DC signal proportional to the difference between the total intensity level of the light spot 24 incident on the photosensor 38 and the selected constant intensity level corresponding to the setting of the reference signal generator 60. This output signal from the differencing amplifier is fed back to the beam attenuator 32 to adjust the latter in response to changes iN the intensity level of the light spot image in such a way as to maintain the image intensity constant at the selected level determined by the setting of the reference signal generator 60.

It will be understood from the description to this point that the image receiver 26 produces a varying DC output signal, at the output of the differencing amplifier 56, whose amplitude is proportional to the displacement of the object surface 14 from its reference position $c$ along the axis of the light beam 12 and whose sign represents the direction of the displacement. The intensity level of the beam is modulated in response to changes in the total intensity level of the light spot image 24 on the photosensor 38 in such a way as to maintain the total image intensity constant at a selected level. It will be immediately evident to those versed in the art that this constant image intensity feature of the invention renders the gaging system immune to the total intensity of the beam 12 and to the reflectivity of the object surface 14. The beam intensity modulation feature of the invention renders the gaging system immune to ambient light. Accordingly, the output of the gaging system is a sole function of the position of the object surface 14 along the axis of the beam 12 and more specifically to the displacement of the surface from its reference position $c$. Gaging system response to changes in beam intensity, surface reflectivity, and ambient light is thereby eliminated.

Figure 3:
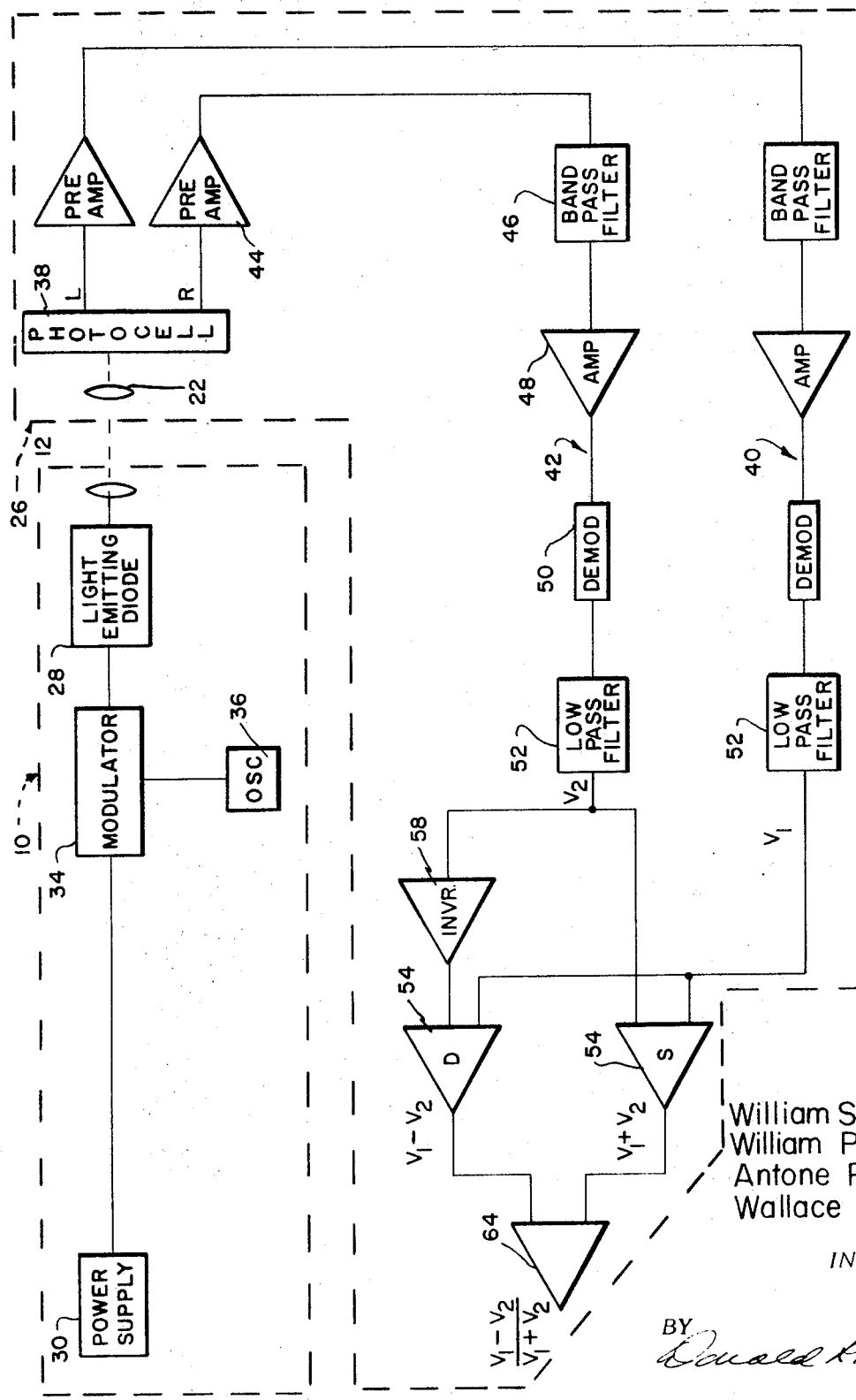
FIG. 3 is an electrical circuit diagram of a modified gaging system.

Attention is now directed to FIG. 3 which illustrates an alternative circuit configuration for eliminating such gaging system response. This alternative circuit configuration differs from that of FIG. 2 only in that the beam attenuator 32 is omitted and the outputs of the summing and differencing amplifiers 54, 56 are fed to a ratioing circuit 64. This circuit produces a DC signal proportional to the ratio $V_1-V_2/V_1+V_2$, where $V_1$ and $V_2$ are the output voltages from the final filters 52 of the circuit channels 40, 42, respectively. In other words, the circuit of FIG. 3, eliminates gaging system response to changes in beam intensity or surface reflectivity by referencing the image displacement signal to the total image intensity. Thus, the circuit of FIG. 3, like that of FIG. 2, is immune to total beam intensity, surface reflectivity, and ambient light and produces a varying DC signal whose amplitude is a sole function of the displacement of the object surface 14 from its reference position $c$ and whose sign represents the direction of the displacement.

As noted earlier, the gaging system of the invention is capable of many varied applications. FIG. 4 illustrates the gaging system used as an optical micrometer. In this case, the object 16, which may comprise a workpiece whose thickness dimension $t$ is to be measured, is placed on a worktable 66. The beam source 10 and image receiver 26 are carried by a support 68 which is mounted over the worktable by means of an upright post 70 rising from the table. The output of the image receiver is connected to an indicating meter 72.

In use of the illustrated optical micrometer, the workpiece is located on the axis of the light beam 12 so that the beam impinges the work surface 14 to illuminate the surface with the light spot 18. Assuming the support 68 is fixed in a vertical position relative to the worktable 66 wherein the light spot image 24 falls at some point along the photosensor 38 of the image receiver 26, it is evident that the output voltage of the receiver, and hence the position assumed by the meter needle, will be related to the thickness $t$ of the workpiece. The meter 72 may obviously be calibrated to read out directly any workpiece thickness within the gaging range of the instrument.

The gaging range of the optical micrometer described above is limited by the maximum displacement of the light spot image 24 along the photosensor 38 of the image receiver 26. This gaging range may be extended by providing the instrument with means for relatively adjusting the worktable 66 and support 68 toward and away from one another. In the illustrated instrument, for example, the support 68 is adjustable along the post 70. The post is provided with a scale 74 which is calibrated to indicate the vertical height of the reference point $c$ above the worktable surface 76. In this case, the meter 72 is calibrated to display the vertical displacement of the workpiece surface 14 from the reference point, and the thickness $t$ of the workpiece is obtained by adding the meter reading to or subtracting this reading from the reading of the scale 74, depending upon whether the work surface is above or below the reference point. Obviously, the meter scale may be marked to indicate whether the meter reading should be added to or subtracted from the scale reading.

FIG. 5 illustrates a modification of the instrument shown in FIG. 4, wherein the vertical height of the reference point $c$ above the worktable surface 76 is sensed electrically by a transducer 78. In this instance, the transducer is a simple slide wire potentiometer which is arranged to produce a DC output proportional to the vertical height of the reference point above the worktable surface. The output voltages of the image receiver 26 and the transducer 78 are fed to a summing amplifier 80. The output of this amplifier is a DC voltage signal proportional to the algebraic sum of the receiver and transducer voltages and hence to the thickness dimension $t$ of the workpiece 16. In this regard, it will be understood that the image receiver 26 and transducer 78 are arranged to produce DC output voltages of the same sign, such that these voltages are added by the summing amplifier 80, when the workpiece surface 14 is located above the reference point $c$. When the work surface is below the reference point, the image receiver produces an output voltage of opposite sign to the transducer output voltage, such that these voltages are subtracted in the summing amplifier. The meter 72 is connected to the output of the summing amplifier and may obviously be calibrated to read directly the thickness dimension of the workpiece.

Turning now to FIG. 6, there is illustrated another application of the present optical gaging system involving, in this case, control of a machine tool 82. The illustrated machine tool is a lathe having a motor 84 for driving a workpiece 86 in rotation and a cutting tool 88 for turning down the workpiece as it rotates. The beam source 10 and image receiver 26 are arranged in optical gaging relation to the workpiece, as shown. Connected to the output of the image receiver 26 is a comparator circuit 90, the output of which is connected to a control relay 92 for the motor 84. In this application, the comparator circuit 90 is arranged to actuate the relay 92 for stopping the motor 84 in response to the output voltage generated by the image receiver 26 when the workpiece 86 has been turned down to a preselected diameter. Obviously, the machine control concept of FIG. 6 may be applied to a great variety of other machining operations.

Figure 7:
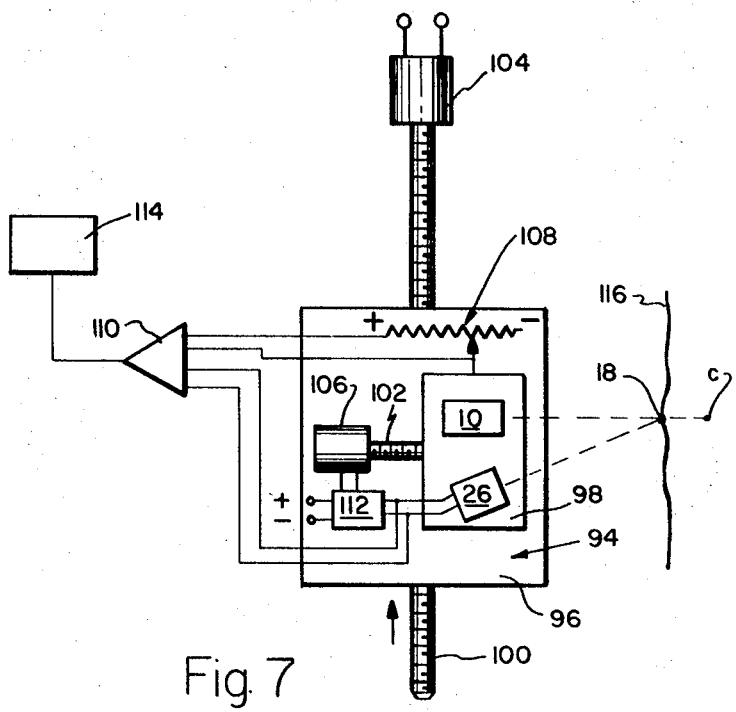
FIG. 7 illustrates an optical profile gage according to the invention.

FIG. 7 illustrates a surface contour or profile gaging instrument according to the invention. In this case, the beam source 10 and image receiver 26 are supported by a carriage 94 including first and second carriage plates 96, 98. Carriage plate 96 is drivably connected to a lead screw 100 so that rotation of the lead screw drives the plate lengthwise of the screw. The second carriage plate 98 is drivably connected to a lead screw 102 on the carriage plate 96 so that rotation of the lead screw 102 drives the carriage plate 98 relative to the carriage plate 96 along a direction line normal to the lead screw 100. Lead screws 100, 102 are driven in rotation by reversible drive motors 104, 106, respectively. Also mounted on the carriage plate 96 is a transducer 108, in this instance a slide wire potentiometer, for generating a DC voltage related to the position of the carriage plate 98 relative to the carriage plate 96 and hence to the position of the beam axis reference point $c$ relative to the work surface.

The outputs of the image receiver 26 and transducer 108 are connected to a summing amplifier 110. The image receiver is also connected to a nulling circuit 112 for controlling the lead screw drive motor 106.

In use, the illustrated profile gaging instrument is arranged so that the lead screw 100 generally parallels the work surface 116 to be gaged. Lead screw motor 104 is energized to drive the carriage 94 and hence the beam source 10 and image receiver 26, along the lead screw 100, thus causing the light beam 12 to scan the surface 116. As the beam proceeds along the surface, the illuminated surface area, or light spot 18, moves back and forth along the beam axis, relative to the axis reference point $c$, in accordance with the contour or profile of the surface. In the earlier discussion, it will be recalled that when the light spot coincides with the reference point $c$, the light spot image 24 occupies its null position on the photosensor 38 and the image receiver 26 generates a null output. Displacement of the light spot along the beam axis to either side of the reference point causes corresponding displacement of the light spot image along the photosensor 38 from the null position. Under these conditions, the image receiver 26 generates a positive or negative output voltage proportional to the image displacement, depending upon the direction of the displacement. The nulling circuit 112 is arranged to control the lead screw motor 106 in response to the receiver output voltage in a manner which tends to constantly maintain a null condition; that is to say, the nulling circuit energizes the motor 106 in response to the receiver output voltage upon displacement of the light spot image from its null position and in a direction to drive the carriage plate 98 relative to the carriage plate 96 in the proper direction to return the image to its null position. In this regard, it will be understood that rotation of the lead screw 102 by its motor 106 effectively moves the reference point $c$ generally normal to the work surface 116. The nulling circuit 112 controls the lead screw motor 106 in response to the image receiver output voltage in such a way that the reference point tends to follow the contour of the work surface.

The output voltages of the image receiver 26 and carriage transducer 108 are fed to the summing amplifier 110, the output of which is the algebraic sum of the voltages, as in the previous embodiment of the invention. It is evident, therefore, that the output of the summing amplifier is a voltage signal representing the profile or contour of the work surface 116. In the particular embodiment of the invention illustrated, the amplifier output if fed to a recorder 114 which produces a continuous record of the work surface profile.

An important feature of the profile gaging instrument resides in the fact that since the instantaneous output of the summing amplifier 110 is the algebraic sum of the instantaneous output voltages from the image receiver 26 and the carriage plate transducer 108, the carriage plate drive mechanism 102, 106, 112 need have only sufficiently rapid response to cause the beam reference point $c$ to follow the profile of the work surface 116 accurately enough to retain the light spot image 24 within the effective range of the photosensor 38. Movement of the light spot image 24 along the photosensor 38 provides the relatively rapid response necessary to accurately gage or sense the local irregularities in the work surface.

The optical gaging instruments described to this point have utilized one light discrimination technique for discriminating reflected light from ambient light. This technique involves intensity modulation of the light beam 12 and electrical filtering the output voltages from the photosensor 38 to filter out the ambient light induced voltage components. FIG. 8 illustrates an alternative light discrimination technique. In this figure, the beam source 10a comprises a light emitter, such as a gas or diode laser, that emits light of a wavelength band which differs substantially from the wavelength range of the ambient light. A sharp band-pass optical filter 118a, which passes only this range of wavelengths, is placed in front of the image receiver 26a. Accordingly, the image receiver receives only reflected light from the object surface 14 being gaged.

Figure 9:
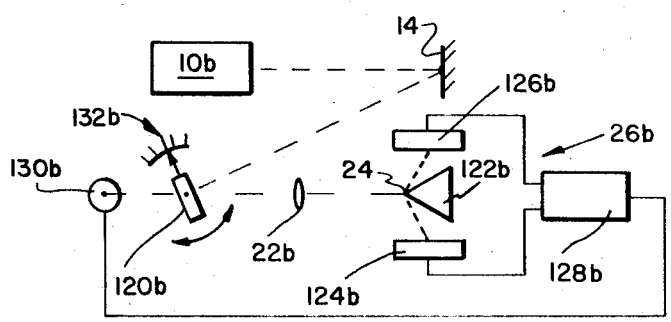
FIG. 9 illustrates a further modified gaging system.

Attention is now directed to FIG. 9 illustrating an optical gaging system according to the invention having a beam source 10b for projecting a beam 12b of light onto the object surface 14, an image receiver 26b and a rotatable mirror 120b for receiving reflected light rays from the illuminated area of the surface and reflecting these rays through the lens 22b to the image receiver. The image receiver comprises, in this instance, a Beam splitter 122b situated on the axis of the lens 22b and a pair of photosensors 124b, 126b located at opposite sides of the beam splitter. A nulling circuit 128 is connected to the output of the photosensors. From this description, it will be understood that light rays emanating by diffuse reflection from the object surface 14 are reflected from the mirror 120b through the lens 22b to the image receiver to produce the light spot image at the receiver.

Assuming that the mirror is so positioned that the light spot image 24 is bisected by the receiver beam splitter 122b, the photosensors 124b, 126b are equally illuminated by the image and the nulling circuit 128b generates a null output. Rotation of the mirror 120b in either direction from this null position displaces the light spot image toward one side or the other of the beam splitter 122b, thereby resulting in unequal illumination of the photosensors 124b, 126b. The nulling circuit 128b then generates a DC output voltage representing the magnitude and direction of displacement of the light spot image from its null position. In the particular inventive embodiment illustrated, the output of the nulling circuit is connected to a motor 130b, drivably coupled to the mirror 120b. The nulling circuit is arranged to control the motor in response to the output voltages from the photosensors 124b, 126b in a manner such as to constantly maintain the null condition; that is to say, the motor tends to constantly maintain the mirror in a position wherein the light spot image is bisected by the beam splitter. From this description, it will be understood that the angular position of the mirror is related to the position of the light spot along the axis of the light beam. The instrument may be provided with any suitable readout means. The illustrated instrument, for example, is provided with a scale 132b for indicating the angle of the mirror 120b. This scale may be calibrated to readout directly the position of the object surface along the beam axis.

We claim:

1. An optical gaging system comprising:
    means for projecting a light beam onto the surface of an object to illuminate said surface with a small light spot;
    means for collecting light rays emanating by diffuse reflection from the illuminated surface area and focusing said rays to produce an image of said light spot in a manner such that relative movement of said light spot along the beam axis causes proportional movement of said image along an image displacement axis;
    means for modulating the intensity of said light beam at a selected frequency differing from any ambient light frequency;
    a photosensor for receiving said image and generating a voltage signal which fluctuates at said selected frequency and has a mean value related to said image position; and
    circuit means including filter means for receiving said signal from said photosensor and tuned to said selected frequency for passing said signal, and means for receiving said signal from said filter means and converting said signal to a varying DC voltage proportional to said mean value.

2. An optical gaging system according to claim 1, including:
    means for regulating the intensity of said light beam in response to the intensity of said image in such a way as to maintain said image intensity relatively constant.

3. An optical gaging system comprising:
    means for projecting a light beam onto the surface of an object to illuminate said surface with a small light spot:
    means for collecting light rays emanating by diffuse reflection from the illuminated surface area and focusing said rays to produce an image of said light spot in a manner such that relative movement of said light spot along the beam axis causes proportional movement of said image along an image displacement axis;
    an image receiver for generating an electrical signal representing the position of said image along said image displacement axis; and
    means for monitoring the intensity of said image, and means for regulating the intensity of said light beam in response to the intensity of said image in such a way as to maintain said image intensity relatively constant.

4. An optical gaging system comprising:
    means for projecting a light beam onto the surface of an object to illuminate said surface with a small light spot;
    means for collecting light rays emanating by diffuse reflection from the illuminated surface area and focusing said ray to produce an image of said light spot in a manner such that relative movement of aid light spot along the beam axis causes proportional movement of said image along an image displacement axis; and
    photosensor means for receiving said image and generating two output voltages whose sum is proportional to the intensity of said image and whose difference is related to the position of said image along said image displacement axis, circuit means for summing said voltages to obtain a resultant voltage proportional to said image intensity and regulating the intensity of said light beam in response to said resultant voltage in such a way as to maintain said image intensity relatively constant, and circuit means for subtracting said output voltages to obtain a differential voltage related to said image position.

5. An optical gaging system comprising:
    means for projecting a light beam onto the surface of an object to illuminate said surface with a small light spot;
    means for collecting light rays emanating by diffuse reflection from the illuminated surface area and focusing said rays to produce an image of said light spot in a manner such that relative movement of said light spot along the beam axis causes proportional movement of said image along an image displacement axis; and
    photosensor means for receiving said light beam and generating two output voltages whose sum is proportional to the intensity of said image and whose difference is related to the position of said image along said image displacement axis; first circuit means for summing said voltages to obtain a resultant voltage proportional to said image intensity; second circuit means for subtracting said voltages to obtain a differential voltage related to said image position; and third circuit means for producing a voltage proportional to the ratio of said differential voltage to said resultant voltage.

6. An optical gaging system comprising:
    means for projecting a light beam onto the surface of an object to illuminate said surface with a small light spot;
    means for collecting light rays emanating by diffuse reflection from the illuminated surface area and focusing said rays to produce an image of said light spot in a manner such that relative movement of said light spot along the beam axis causes proportional movement of said image along an image displacement axis;
    means for modulating the intensity of said light beam at a selected frequency; and
    photosensor means for receiving said image and generating two output voltages which fluctuate at said selected frequency and whose sum has a means value proportional to the intensity of said image and whose difference has a mean value related to the position of said image along said image displacement axis; first circuit means responsive to said selected frequency only for producing varying DC voltages proportional to the means values of said output voltages, respeCtively; second circuit means for summing said DC voltages to obtain a resultant voltage in such a way as to maintain said image intensity relatively constant; and third circuit means for subtracting said DC voltages to obtain a differential voltage related to said image position.

7. An optical gaging system comprising:

means for projecting a light beam onto the surFace of an object to illuminate said surface with a small light spot;

means for collecting light ray emanating by diffuse reflection from the illuminated surface area and focusing said rays to produce an image of said light spot in a manner such that relative movement of said light spot along the beam axis causes proportional movement of said image along an image displacement axis;

means for modulating the intensity of said light beam at a selected frequency; and photosensor means for receiving said image and generating two output voltages which fluctuate at said selected frequency and whose sum is proportional to the intensity of said image and whose difference is related to the position of said image along said image displacement axis; first circuit means responsive to said selected frequency only for filtering said output voltages to produce varying DC voltages proportional to the mean values of said output voltages; second circuit means for summing said DC voltages to provide a resultant DC voltage proportional to image intensity; third circuit means for subtracting said DC voltage related to said image position; and third circuit means for producing a varying DC voltage proportional to the ratio of said differential voltage to said resultant voltage.

8. An optical gaging instrument comprising:

a worktable for supporting a workpiece to be gaged;

a beam source for projecting a light beam onto the surface of said object to illuminate said surface with a small light spot;

an image receiver including means for collecting light rays emanating by diffusive reflection from the illuminated surface area and focusing said rays to produce an image of said light spot in a manner such that relative movement of said light spot along the beam axis causes proportional movement of said image along an image displacement axis, and means for receiving said image and generating an electrical signal representing the displacement of said image from a reference position along said image displacement axis which said image occupies when said light spot is located at a reference point along said beam axis;

means supporting said beam source and image receiver for relative movement in unison toward and away from said worktable to vary the distance between said reference point and said worktable;

means for producing an electrical signal representing said latter distance; and circuit means for combining said electrical signals to provide a resultant electrical signal representing the distance between said light spot and said worktable.

9. An optical profile gage for gaging the contour of a work surface comprising:

a carriage including a first carriage member, means for driving said carriage member along said surface, a second carriage member supported on said first carriage member for movement toward and away from said work surface along a direction line transverse to the direction line of movement of said first member, and reversible drive means for driving said second member along its direction line of movement relative to said first member;

a beam source mounted on said second member for projecting a light beam onto said work surface to illuminate said surface with a small light spot;

an image receiver on said second member including means for collecting light rays emanating by diffuse reflection from the illuminated surface area and focusing said rays to produce an image of said light spot in a manner such that relative movement of said light spot along the beam axis causes proportional movement of said image along an image displacement axis, and photosensitive means for receiving said image and generating an electrical signal representing the displacement of said image from a reference position along the displacement axis which said image occupies when said light spot is located at a reference point along said beam axis;

means for controlling said reversible drive means in response to said electrical signal in such a way as to cause said reference point to follow approximately the contour of said surface;

a transducer for generating an electrical signal representing the position of said second carriage member along its direction line of movement relative to said first carriage member; and means for combining said electrical signals to provide a resultant signal which varies in accordance with the contour of said surface.

10. An optical gaging method comprising the steps of:

projecting a light beam onto the surface of an object to illuminate said surface with a small light spot;

collecting light rays emanating by diffuse reflection from the illuminated surface area and focusing said rays to produce an image of said light spot in a manner such that relative movement of said light spot along the beam axis causes proportional movement of said image along an image displacement axis;

generating an electrical signal representing the position of said image along said image displacement axis;

sensing the intensity of said image; and regulating the intensity of said beam in response to the intensity of said image in such a way that to maintain said image intensity relative constant.

11. An optical gaging method comprising:

projecting a light beam onto the surface of an object to illuminate said surface with a small light spot;

collecting light rays emanating by diffuse reflection from the illuminated surface area surface area and focusing said rays to produce an image of said light spot in a manner such that relative movement of said light spot along the beam axis causes proportional movement of said image along an image displacement axis;

generating two output voltages whose sum represents the intensity of said image and whose difference represents the displacement of said image from a given reference position along said image displacement axis;

adding said voltages to obtain a resultant voltage representing said image intensity;

subtracting said voltages to obtain a differential voltage representing said image displacement; and generating a voltage proportional to the ratio of said differential voltage to said resultant voltage.

12. An optical gaging method which comprises the steps of:

projecting a light beam onto the surface of an object to illuminate said surface with a small light spot;

modulating the intensity of said beam at a selected frequency differing from any ambient light frequency;

collecting light rays emanating by diffuse reflection from the illuminated surface area and focusing said rays to produce an image of said light spot in a manner such that relative movement of said light spot along the beam axis causes proportional movement of said image along an image displacement axis;

receiving said image on a photosensor for generating a fluctuating output voltage of said selected frequency having a mean value representing the position of said image along said displacement axis;

passing said signal through a filter tuned to said selected frequency; and converting the signal from said filter to a resultant varying DC signal proportional to said mean value.

13. An optical gaging system comprising:
means for projecting a light beam onto the surface of an object to illuminate said surface with a small light spot;
means for collecting light rays emanating by diffuse reflection from the illuminated surface area and focusing said rays to produce an image of said light spot in a manner such that relative movement of said light spot along the beam axis causes proportional movement of said image along an image displacement axis; and
means for receiving said image and producing two output voltages whose sum represents the intensity of said image and whose difference represents the position of said image along said image displacement axis.

14. An optical gaging system according to claim 13 wherein:
said receiving means comprises a linear photocell arranged along said image displacement axis.

15. An optical gaging system according to claim 13 wherein:
said receiving means comprises a pair of photocells, and an optical beam splitter along said image displacement axis for transmitting to said photocells portions of said image whose relative intensity represents the position of said image along said image displacement axis.

16. An optical profile gage for gaging the contour of a work surface comprising:
a carriage including a first carrier member, means for driving said carriage member along said surface, a second carriage member supported on said first carriage member for movement toward and away from said work surface along a direction line transverse to the direction line of movement of said first member, and reversible drive means for driving said second member along its direction line of movement relative to said first member;
a beam source mounted on said second member for projecting a light beam onto said work surface to illuminate said surface with a small light spot;
an image receiver on said second member including means for collecting light rays emanating by diffuse reflection from the illuminated surface area and focusing said rays to produce an image of said light spot in a manner such that relative movement of said light spot along the beam axis causes proportional movement of said image along an image displacement axis, and photosensitive means for receiving said image and generating an electrical signal representing the displacement of said image from a reference position along the displacement axis which said image occupies when said light spot is located at a reference point along said beam axis;
means for controlling said reversible drive means in response to said electrical signal in such a way as to cause said reference point to follow approximately the contour of said surface; and
a transducer for generating an electrical signal representing the position of said second carriage member along its direction line of movement relative to said first carriage member.

17. An optical gaging method comprising:
projecting a light beam onto the surface of an object to illuminate said surface with a small light spot;
collecting light rays emanating by diffuse reflection from the illuminated surface area and focusing said rays to produce an image of said light spot in a manner such that relative movement of said light spot along the beam axis causes proportional movement of said image along an image displacement axis; and
generating two output voltages whose sum represents the intensity of said image and whose difference represents the displacement of said image from a given reference position along said image displacement axis.

UNITED STATES PATENT OFFICE
CERTIFICATE OF CORRECTION

Patent No. 3,612,890          Dated October 12, 1971

Inventor(s) William S. Cornyn, Jr. et al

It is certified that error appears in the above-identified patent and that said Letters Patent are hereby corrected as shown below:

Col. 1, line 51    delete "a lens to focus the beam at the observation station,";

line 52    delete in its entirety;

line 53    delete "at the focal point of".

Col. 6, line 74    after "workpiece" insert -- 16 --.

Signed and sealed this 19th day of November 1974.

(SEAL)
Attest:

McCOY M. GIBSON JR.          C. MARSHALL DANN
Attesting Officer            Commissioner of Patents